(12) United States Patent
Schamberg et al.

(10) Patent No.: US 6,305,268 B1
(45) Date of Patent: Oct. 23, 2001

(54) MACHINE FOR PREPARING HOT BEVERAGES

(75) Inventors: Stefan Schamberg, Usingen; Uwe Schober, Eppstein; Heinz Kelterborn, Karben; Bernd Trebitz, Butzbach, all of (DE)

(73) Assignee: Braun GmbH, Frankfurt (DE)

( * ) Notice: Subject to any disclaimer, the term of this patent is extended or adjusted under 35 U.S.C. 154(b) by 0 days.

(21) Appl. No.: 09/548,463

(22) Filed: Apr. 13, 2000

Related U.S. Application Data

(63) Continuation of application No. PCT/EP98/07052, filed on Nov. 5, 1998.

(30) Foreign Application Priority Data

Dec. 2, 1997 (EP) ................................................ 97 121 912

(51) Int. Cl.⁷ ..................................................... A47J 31/00
(52) U.S. Cl. ................................. 99/283; 99/280; 99/285
(58) Field of Search ............................. 99/285, 280, 283, 99/282, 299, 300

(56) References Cited

U.S. PATENT DOCUMENTS

| | | | |
|---|---|---|---|
| 4,055,114 | * 10/1977 | Kats et al. ............................. | 99/280 |
| 4,328,740 | 5/1982 | McDonough et al. ................. | 99/295 |
| 4,468,406 | 8/1984 | d'Alayer de Costemor d'Arc ................ | 99/280 X |
| 5,778,764 | * 7/1998 | Nielsen ................................... | 99/285 |
| 6,067,894 | * 5/2000 | Eugster .................................. | 99/285 |

FOREIGN PATENT DOCUMENTS

| | | |
|---|---|---|
| 1579562 | 9/1969 | (DE) . |
| 29701818 U1 | 6/1997 | (DE) . |
| 29718374 U1 | 4/1998 | (DE) . |
| 3736517 C1 | 11/1998 | (DE) . |

* cited by examiner

Primary Examiner—Reginald L. Alexander
(74) Attorney, Agent, or Firm—Fish & Richardson P.C.

(57) ABSTRACT

The present invention relates to a machine for preparing hot beverages, comprising a water tank (1) which can be filled with water (23) and a brewing unit (6) which can be filled with an ingredient (9) such as ground coffee or tea leaves. The water (23) is heated and supplied to the brewing unit (6) for extraction. After the extraction process, the hot beverage (24) flows into a container (8). The machine for preparing hot beverages includes a device (10, 11) for sensing the amount of water and ingredients. The device (10, 11) sends corresponding electric signals to an electronic evaluation device (14). The electronic evaluation device (14) indicates the detected strength of the hot beverage on an indicator instrument (17). The degree of strength may be varied by this arrangement in conformity with a user's taste. Further, only that amount of ingredients required for the desired strength of the beverage is used.

32 Claims, 1 Drawing Sheet

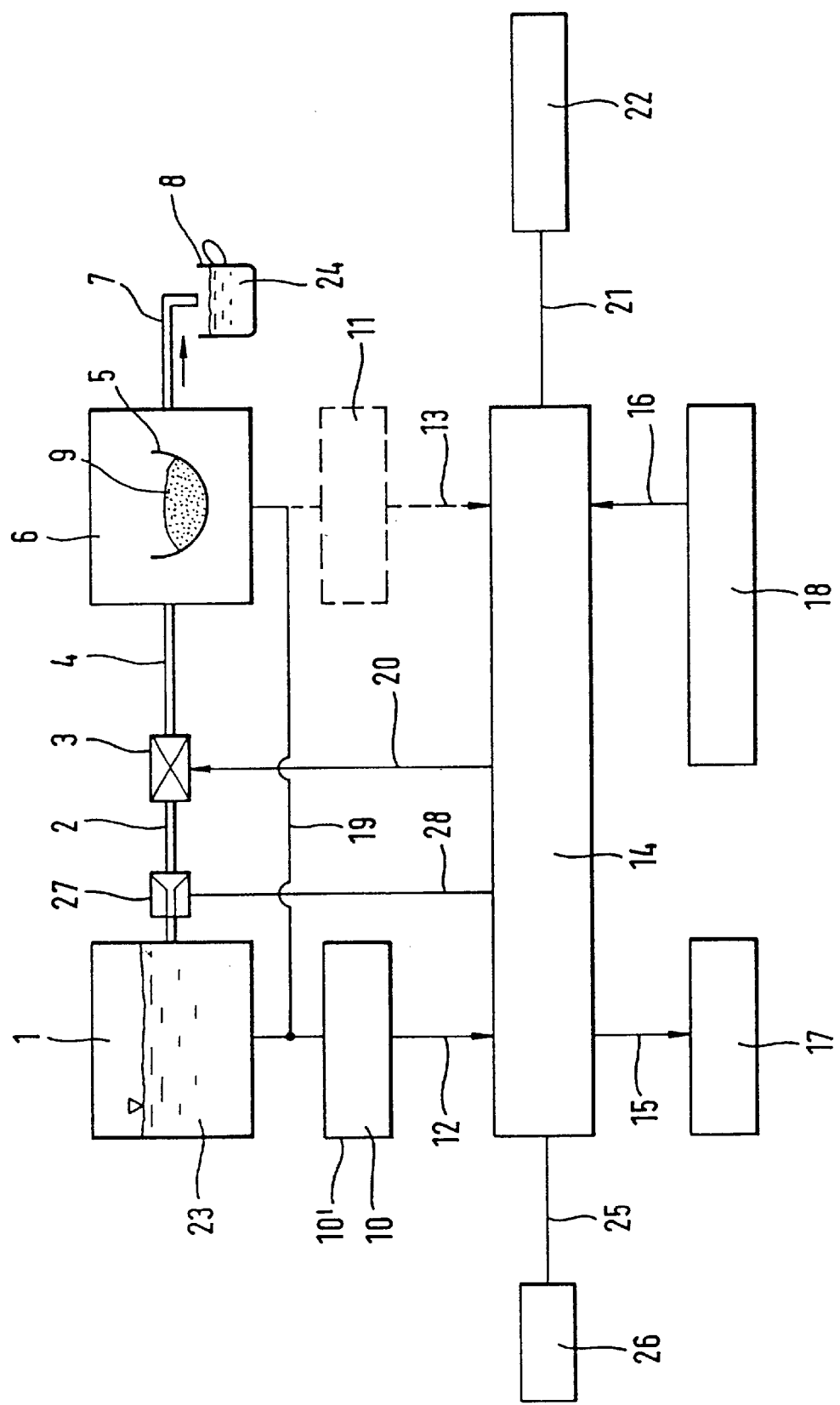

MACHINE FOR PREPARING HOT BEVERAGES

This is a continuation of PCT application Ser. No. PCT/EP98/07052, filed Nov. 5, 1998, which claims priority from European application serial number 97121912.6, filed Dec. 12, 1997, (pending).

BACKGROUND OF THE INVENTION

The present invention relates to an electrically operated machine for preparing hot beverages, comprising a water tank that can be filled with water and a brewing unit into which an ingredient such as ground coffee or tea leaves can be introduced, wherein the water is heated in an electric water heater and supplied to the brewing unit for extraction, and the beverage extracted flows into a container.

In an electric machine for preparing hot beverages which is operated as a coffee machine, it is prior disclosed to place a paper filter into the filter basket member and to then fill it with an ingredient, preferably coffee. To indicate to a user which amount of ingredients is required depending on the number of cups, indicia in the form of lines or circles have been marked in the interior of the paper filter. Thus, when a user chooses five cups of water, for example, he/she will fill the corresponding amount of water into the water tank. Subsequently, the user fills so great an amount of ingredients into the paper filter until the ingredient covers the fifth mark or just about ends flush with it.

Marks of this type which are provided on the paper filter represent a dosing aid to a user, but they are relatively inexact, especially because paper filters generally taper downwards in a V-type configuration and are often crushed so much that their receiving volume is comparatively inexact.

Further, the fact that it is necessary to shake the amount of coffee introduced into the brewing unit until it is positioned substantially horizontally to the marks is complicated and difficult to handle. If the shaking action is omitted, an exact dosing process is not possible.

It is further disclosed in the art in a machine for preparing hot beverages to apply two scales side by side on the outside wall of the water tank, one of the scales indicating the amount of water by showing the number of cups and the second scale indicating the amount of ground coffee by showing the number of scoops required. Thus, when an amount of water has been introduced into the tank, the scale shows the water level for the number of cups desired and, simultaneously, the adjacent scale for the amount of ground coffee indicates the number of scoops of ground coffee needed for this amount of water. However, only average values can be achieved by a dosing aid of this type which do not allow accurately determining the strength of a brew that is individually desired by a user.

In spite of this simplified dosing aid, a user is initially required to read the correct number of measuring scoops for the quantity of brew desired, to then count them when ground coffee in filled in and pay attention that the measuring scoops are always filled to an almost equal extent in order to obtain a hot beverage of equal taste. This process is comparatively complicated and necessitates great attention by a user.

In view of the above, an object of the present invention is to provide a machine for preparing hot beverages which provides greater ease to a user in dosing the ingredients and water and which, irrespective of the number of cups, permits making coffee which may always be reproduced with the same quality, and with the ratio of the amount of ingredients and water in dependence on the strength of brew desired being always correct. Another objective is to render the machine for preparing hot beverages as inexpensive as possible and especially economical in the consumption of the amount of ingredients required.

SUMMARY OF THE INVENTION

According to the present invention, this object is achieved by one of the following three aspects of the invention. The first aspect is a machine for preparing hot beverages, comprising a water tank that can be filled with water and a brewing unit into which an ingredient such as ground coffee or tea leaves can be filled, wherein the water is heated and supplied to the brewing unit for extraction and, after the extraction process, flows as a hot beverage into a container, characterized in that the machine for preparing hot beverages includes a device for sensing the amount of water and ingredients, in that the device sends corresponding electric signals to an electronic evaluation device, and in that the electronic evaluation device indicates the resulting degree of strength of the hot beverage on an indicator instrument. The second aspect is a machine for preparing hot beverages, comprising a water tank that can be filled with water and a brewing unit into which an ingredient such as ground coffee or tea leaves can be filled, wherein the water is heated and supplied to the brewing unit for extraction and, after the extraction process, flows as a hot beverage into a container, characterized in that the machine for preparing hot beverages includes a devices for sensing the amount of water and the degree of strength of the desired hot beverage, in that the device sends corresponding electric signals to an electronic evaluation device, and in that the electronic evaluation device indicates the necessary amount of ingredients on an indicator instrument. The third aspect is a machine for preparing hot beverages, comprising a water tank that can be filled with water and a brewing unit into which an ingredient such as ground coffee or tea leaves can be filled, wherein the water is heated and supplied to the brewing unit for extraction and, after the extraction process, flows as a hot beverage into a container, characterized in that the machine for preparing hot beverages includes a device for sensing the amount of ingredients and the degree of strength, in that the device sends corresponding electric signals to an electronic evaluation device, and in that the electronic evaluation device indicates the amount of water for the hot beverage on an indicator instrument.

In the first aspect of the invention, the amount of water disposed in the water tank and the amount of ingredients introduced into the brewing unit is sensed electronically, and corresponding signals can be sent to an electronic evaluation device which causes activation of an indicator instrument, such as a display, light-emitting diodes of different colours, or a speech memory, which output the strength of the brew. In addition, the amount of water and ingredients may of course also be indicated. Thus, the first invention renders it possible to determine an accurately defined degree of strength of the brew in dependence on the number of cups and the amount of ingredients. In case the brew is too strong, an amount of ingredients is removed from the brewing unit, if it is too mild, an amount of ingredients will be added. This process is carried out until the desired strength of the brew on the indicator instrument is in conformity with the actual degree of strength. Consequently, only that amount of ingredients required for the desired strength of the brew and the number of cups is used in the present invention. This means that dosing for a hot beverage is for the first time performed by an electronic evaluation device rather than by a user, the said device exactly dosing the strength of the beverage in dependence on the ratio of the amount of water to the amount of ingredients. This first invention is applicable in all machines for preparing hot beverages, especially in coffee-makers for household requirements which hold the major market share as far as machines for preparing hot beverages are concerned. However, it is also possible to implement the first invention in tea makers. For such an implementation, the sensor device that is required for sensing the necessary amount of tea leaves must only be rendered comparatively sensitive because the weight or the volume of tea leaves is substantially lower than that of ground coffee. However, the first invention is also applicable in other brewing operations, such as for preparing a bouillon, hot chocolate, etc. In such a case, it is only required to install another and different type of electronic evaluation device.

Because it is easier to manually dose water than ground coffee, the first aspect of the invention would lend itself to being employed as a semi-automatic unit in a machine for preparing hot beverages, wherein the amount of ground coffee is weighed electronically and the amount of water is inputted electronically by way of an actuating device. The inputted signals are then compared in an electronic evaluation device with predetermined values stored therein. The so determined intensity of the brew is outputted on the indicator instrument.

In the second aspect of the invention, the amount of water is determined in a measuring device, and the degree of strength is inputted by way of an electric actuating device, with the electric signals of the latter device being sent to an electronic evaluation device where they are processed electronically. Finally, the amount of ingredients computed is shown on an indicator instrument. It is of course also possible to display the amount of water and the degree of strength of the brew. Subsequently, it is only necessary that a user fills the amount of ingredients required into the brewing unit. This solution is also extremely helpful to a user because it is the request of many coffee drinkers that the degree of strength of the hot beverage remains constant irrespective of the number of cups prepared. The electronic evaluation device may be so configured that a signal will not be shown on the indicator instrument until the amount of ground coffee introduced in dependence on the number of cups results in the desired degree of strength of the hot beverage. This second invention may also be implemented in all machines for preparing hot beverages, especially in a tea maker.

The third aspect of the invention is chosen by a user when only a certain amount of ingredients is available, yet a determined degree of strength is desired nonetheless. In this aspect of the invention, only so much water is indicated for filling as is necessary for the degree of strength desired, in dependence on the amount of ingredients at disposal. This variant is chosen when the number of cups desired is not exactly predetermined, or the amount of ground coffee is limited. This solution could also be used as a semi-automatic unit in a machine for preparing hot beverages when the amount of ground coffee is sensed electronically by means of a weighing apparatus and the degree of strength of the brew is set manually, and the amount of water determined by the electronic evaluation device is also inputted by hand. However, a measuring cup or a measuring scale on the water tank conformed to the system should be used for the dosed amount of water. In this case, it is of course also possible to display the amount of ingredients and the degree of strength.

All three inventions may be realized in a machine for preparing hot beverages so that in each case two parameters are sensed by the measuring device, and the third parameter is determined by the electronic evaluation device and subsequently displayed on the indicator instrument. The indicator instrument shows the actual value which was determined on the basis of the input of values. However, the indicator instrument may also display the lacking amount which is still required for reaching the desired nominal point.

According to the features of particular embodiments of various aspects of the invention, the machine for preparing hot beverages includes an actuating device, for example, one or more switches, for inputting the amount of water according to the number of cups desired. This may be done, for example, by way of actuating a push-button several times, corresponding to the number of cups, or by selecting one of several push-buttons which are respectively associated with a determined number of cups. For twelve cups, twelve actuating push-buttons would have to be provided in the latter solution. However, the number of push-buttons could also be reduced to two, in case one switch would be provided for five cups and another switch for one cup, for example.

According to other features of various aspects of the invention, a weighing apparatus is used to determine the amount of water, which is e.g. equipped with a spring balance, a pressure-controlled quartz, a resistance gauge, or other devices which determine weight. Weighing apparatus of this type are comparatively inexpensive, and the two devices mentioned as last will instantaneously generate an electric signal, while the spring-loaded weighing apparatus must still be equipped with an electrical conversion, such as a variable resistor, in order to send a necessary electric signal to the electronic evaluation device.

According to other features of various aspects of the invention, a volume measuring station may also be used to determine the amount of water, with the said station determining the volume of water by way of an electric filling level measuring device which is so gauged that, due to a constant surface cross-section, different amounts of water result with different levels. The amount of water may also be determined by means of an electrically operated flow measuring device wherein, for example, the water which flows through a pipe drives a wheel which, in turn, by way of an electric measuring station emits a signal corresponding to the measured rotations to the electronic evaluation device. It is also possible, however, to control the measurement of the number of cups by a pump which may have its on-time associated with a defined amount of water when the rotational speed of the pump and the thus produced delivery rate per time unit are constant.

According to other features of various aspects of the invention, sensing the amount of ingredients may be effected by a second weighing station. It is principally possible to use weighing stations of identical design both for sensing the amount of ingredients and for sensing the amount of water. However, the measuring accuracy and the measuring range of the weighing apparatus for the amount of ingredients may be chosen differently than that in the weighing apparatus for the water because the weight of the amount of considerably lighter than water.

According to other features of various aspects of the invention, the measuring device may also be provided by the feed performance of a delivery device such as a feeding screw. In this case, too, the precondition is that the feed performance per time unit is always constant.

According to other features of various aspects of the invention, a type of volume measuring station may also be chosen wherein the surface of the amount of ingredients is scanned by means of light rays or infrared rays, or similar scanning devices. Depending on the degree of filling, the height of the filling level will vary and, consequently, also the time it takes for a light ray from a light source to strike the surface of the ingredient, to be reflected and received by a receiver.

According to the features of one exemplary embodiment of the invention, a particularly simple sensing device with only one single sensor which determines the weight of the machine for preparing hot beverages after each individual filling operation. It is necessary, however, to either weigh the entire machine for preparing hot beverages, or the water tank including the brewing unit. The electronic unit should be aligned so that irrespective of whether water or ground coffee was the first to be filled in, it recognizes which substance was inserted first. This may be found out, for example, by means of a different rise per time unit of the weight of ground coffee in relation to water when the substances are filled in. However, this may also be found out by the weighing apparatus and the electronic evaluation device because the weight of only one cup of water (135 g approximately) is always higher than the weight of the ground coffee for 12 cups which roughly amounts to 80 g. Twelve cups is the maximum number of cups one may prepare in machines for preparing hot beverages conventionally used in households. The distinction between the substances may also be made by the device indicating which substance should be filled in as first. However, if the wrong substance is filled in, wrong measurements would be induced unless an error detection device was installed.

It is possible according to other features of various aspects of the invention to adjust the degree of strength preferred by a user by data input, to store the data in the electronic evaluation device and to then project the required amount of ground coffee in dependence on varying numbers of cups so as to achieve always the same degree of strength of a brew as a result. The level of the degree of strength may also be adjusted and set by means of the electronic evaluation device so that a user may reduce or increase the degree of strength "mild". This reduction also applies to "medium" and "strong" coffee. Thus, a user who likes to drink "medium" coffee a little bit "stronger" may intensify the coffee's taste by means of this electric level control.

According to other features of various aspects of the invention, the electronic evaluation device is so configured that it knows at least three degrees of strength which may be selected by way of an actuating device in the form of one or more actuating buttons. When one single actuating button is provided, this button must be pushed three times when the degree of strength 3 is chosen. With three buttons, it is only required to push the actuating button associated with the degree of strength 3. However, it is also possible to memorize any desired degree of strength between 1 and 3 electronically in tenths' steps and to correspondingly set and check the dosing of the amount of coffee and water.

According to other features of various aspects of the invention, the values gathered in the combinations put forth in the above described aspects of the invention are stored in one table of values in a microprocessor. This table of values is polled by the microprocessor corresponding to an input, and the value searched for is thereby found.

The respective actual condition or the nominal condition of the degree of strength, or the amount of ingredients, or the amount of water can be indicated to a user according to other features of various aspects of the invention. The specification may be in percent, in weight, or in a ratio. Weighing by counting downwards until the point desired is also possible.

A simple indicator instrument can be provided by one or more lamps. With three lamps, for example, the middle lamp indicates the optimum value, while the lamp on the left thereof indicates a too low value, and the lamp on top thereof indicates a too high value. The indicator instrument may also be provided by lamps of different colours, with the green lamp indicating the optimum value when displaying the degree of strength, for example, the yellow lamp displaying a too low and the red lamp a too high value. It is also possible though to configure the indicator instrument as an acoustical means operating by sound signals or speech control.

BRIEF DESCRIPTION OF THE DRAWINGS

FIG. 1 shows a schematic view of a block diagram in which only those components that are important to the present invention are illustrated.

Reference numeral 1 designates a water tank, the water 23 of which can be heated in a continuous water heater which is used as a pump and, additionally, as an electric water heater 27, connected to an electronic evaluation device 14 by way of a control conduit 28. From water tank 1, a conduit 2 extends to a flow rate control device 3 which, in turn, is connected to a filter 5 of a brewing unit 6 by way of a conduit 4. The brewing unit 6 is a component of a machine for preparing hot beverages which is not illustrated in the drawing, in which the block diagram illustrated in the only FIGURE is integrated in hardware though.

The brewing unit 6 has an outlet 7 through which the hot beverage prepared may be discharged into a container 8 placed therebeneath. Both the liquid 23 in water tank 1 and the amount of ingredients 9 to be inserted into filter 5 are connected to each other by way of a sensor device 10, 11, respectively, so as to allow determination of the quantities introduced into the water tank 1 and the filter 5 by way of the sensor devices 10 and 11, respectively. Electric lines 12, 13 which extend from the sensor devices 10, 11 are connected to an electronic evaluation device 14 which, in turn, is connected by way of electric lines 15, 16 to a display 17 or any other indicator instrument and to an electrically operable cup preselection device 18. While line 15 that extends from the electronic evaluation device 14, which is preferably a microprocessor, furnishes the display 17 with corresponding signals, line 16 sends a pulse to the electronic evaluation device 14 in order to indicate to it the number of cups desired.

Sensor device 11 and line 13 are shown in dotted lines because they may be omitted when sensor device 10' determines both the measuring data of the water tank 1 and those of the brewing unit 6. Connecting line 19 will serve for this purpose then. Further, the electronic evaluation device 14 is connected to the flow rate control 3 by way of a line 20. The display 17 may be configured as an LCD display, light-emitting diodes, or any other display indicating the degree of strength of the hot beverage. The cup preselection device 18 can be comprised of individual switches (not shown) for one cup each, or of one single switch which is then connected to the electronic evaluation device 14 in such a fashion that the latter device determines and stores the consecutively issued switching signals per cup.

By way of another line 21, the electronic evaluation device 14 is connected to an electric actuating device 22 which is used for manually inputting the number of cups desired, the amount of ingredients and the degree of strength. Further, the electronic evaluation device 14 is connected by way of an electric line 25 to an electric time element 26 by which the time, and the on-time and off-time of the machine for preparing hot beverages can be controlled.

The operation of the machine for preparing hot beverages of the present invention is as follows:

Initially, water is introduced into tank 1 according to the first invention. Sensor device 10 determines the amount of water and indicates this value to the electronic evaluation device 14. Ground coffee 9 or tea leaves is now introduced into filter 5, and sensor device 11 measures this quantity and indicates its value also to the electronic evaluation device 14. When only one single sensor device 10 is used, initially, the water is measured, the value of content is indicated to the electronic evaluation device, and subsequently the amount of ingredients 9 is measured and the measured data is also sent to the electronic evaluation device. The electronic evaluation device 14 should be so configured that it detects the increase in weight which is considerably higher with water than with any ingredient, and therefore records which medium was filled in as first. In case only one single sensor device 10 is chosen, it is appropriate to weigh the entire coffee machine in order to indicate the gain in weight.

After the electronic evaluation device 14 has received the measured values for coffee, or tea, and water, display 17 by way of line 15 is fed with electric pulses which will alternatively indicate the amount of water, the amount of coffee and/or the difference between the ideal amount of coffee in relation to the amount of water, or vice-versa, or the degree of strength depending on the desire of a user. The level of the degree of strength may also be calibrated, i.e. lowered or raised, individually by a user by way of an adjusting device (not shown) in the electronic evaluation device 14. The latter design renders it possible to a user to retroactively adjust the dosing of coffee or water until the desired degree of strength is reached.

When it is desired to brew only a partial quantity of the water volume filled in the water tank 1, this operation may be effected by a manually operable electric cup preselection device according to the present invention. The number of cups is inputted by an input device which, in turn, sends electric pulses to the electronic evaluation device by way of line 16. The electronic evaluation device 14 will then check the flow rate control device 3 by way of line 20 so that it knows at any time how much water has flown from the water tank 1 to the filter 5. However, the electronic control must be reset to zero with each new brewing operation. Advantageously, the flow rate control device 3 may be achieved by a time-controlled magnetic valve, the control of a pump 27 itself (especially, when the pump is a continuous flow heater 27 operating by feeding vapour bubbles as mostly used in coffee makers currently on the market) or by other flow rate measuring devices.

The electronic evaluation device 14 can also be connected by way of another line 21 to an electric actuating device 22 which, when actuated, indicates the desired degree of strength of the hot beverage to the electronic evaluation device 14 and exhibits it on display 17. The actuating device 22 again may be comprised of one single or several actuating push-buttons with switches positioned behind them by which the degree of strength is inputted into the electronic evaluation device 14. Thus, when the degree of strength is inputted into the electronic evaluation device by way of the actuating device 22 and the cup preselection is inputted by way of the cup preselection device 18, the necessary amount of ingredients in grams, or volume, or the number of scoops can be indicated on display 17. When lamps are used, it is sufficient that a lamp indicates the amount of ingredients by "too little", "correct" or "too much". For better distinction, the lamps may have different colours, for example, red, yellow, and green. Thus, a user will only fill an ingredient 9 into filter 5, and the display will indicate after evaluation whether the amount of ingredients is correct, too little, or too much for the number of cups selected and the degree of strength desired.

After the machine for preparing hot beverages has been switched on, which can also be controlled automatically by the microprocessor after the correct data input of water, degree of strength, and ground coffee, the amount of water is heated and flows into filter 5. During this action, the amount of water is checked by the flow rate measuring device 3, and the machine is switched off as soon as the amount of water which has flown through corresponds to the number of cups preselected. The machine for preparing hot beverages will produce an optimal hot beverage as desired by a user also in this case.

Another invention involves filling a defined amount of ingredients 9 into the filter 5. Sensor device 11 sends the value thereof to the electronic evaluation device 14. Now the cup preselection device is actuated corresponding to the number of cups desired, and a desired amount of water is filled into the water tank, the quantity of which is then measured by the sensor device 10. The measured data is sent to the electronic evaluation device 14. The latter device will now calculate or determine by means of a table of values whether the coffee to be prepared will be mild, medium, or strong in view of the number of cups preselected. In case the coffee is too mild, the user is still permitted to reduce the number of cups by actuating the cup preselection device 18 until the desired degree of strength appears on the display 17. In case the degree of strength is too high, it is possible to replenish water until the desired degree of strength is reached. Subsequently, the machine can be switched on for the brewing operation.

Of course, the electronic evaluation device includes a table of values which compares the input data with fixed data. As soon as crossing data are traced, the sought value is found and will be shown on the display 17. Whether coffee is strong, medium, or mild must be determined beforehand by way of taste tests conducted by users, and the values found must be stored in a table of values.

In all three inventions, the electronic evaluation device may also be configured so that the indicator instrument displays the value reached after each operation of weighing by counting upwards or downwards. This permits a more accurate dosing process.

A machine for preparing hot beverages in which the present invention is implemented can operate fully automatically, i.e., after the machine is switched on, it measures the amount of water to be brewed and the amount of ingredients and indicates the degree of strength of the hot beverage on an indicator instrument. When the ideal value has been reached, the machine will be switched on, unless a delay in switching on is expressly desired. The same applies to the end of the brewing operation.

What is claimed is:

1. A machine for preparing a hot beverage, the machine comprising:

a water tank;

a brewing unit into which an ingredient can be placed;

a heating unit for heating water from the water tank and supplying heated water to the brewing unit for extraction to produce the hot beverage;

a sensing system for sensing both an amount of water to be supplied to the brewing unit from the water tank and an amount of the ingredient placed in the brewing unit, the sensing system sending a first electric signal corresponding to said amount of water and a second electric signal corresponding to said amount of the ingredient; and an electronic evaluation device having an indicator instrument, the electronic evaluation device receiving said first and second electric signals and indicating a resulting degree of strength of the hot beverage on the indicator instrument.

2. The machine for preparing a hot beverage of claim 1, wherein the sensing system comprises an actuating device which can be operated by a user to enter an input signal for controlling said amount of water, said input signal corresponding to a desired number of cups of the hot beverage to be produced.

3. The machine for preparing a hot beverage of claim 1, wherein the sensing system comprises a first weighing apparatus for sensing the amount of water.

4. The machine for preparing a hot beverage of claim 1, wherein the sensing system comprises a volume measuring station for sensing the amount of water.

5. The machine for preparing a hot beverage of claim 1, wherein the sensing system comprises a flow rate measuring device for sensing the amount of water.

6. The machine for preparing a hot beverage of claim 1 further comprising a pump for delivering water from the water tank to the brewing unit, the pump delivering a defined amount of water per time unit, wherein the sensing system comprises a time sensor for sensing an active time period of operation of the pump for sensing the amount of water.

7. The machine for preparing a hot beverage of claim 3, wherein the sensing system comprises a second weighing station for sensing the amount of the ingredient.

8. The machine for preparing a hot beverage of claim 1, further comprising a feeding device that delivers a defined amount of the ingredient per time unit, wherein the sensing system comprises a time sensor for sensing an active time period of the feeding device.

9. The machine for preparing a hot beverage of claim 1, wherein the sensing system comprises a volume measuring station for sensing the amount of the ingredient.

10. The machine for preparing a hot beverage of claim 1, wherein the sensing system comprises an actuating device which can be operated by a user to enter an input signal for controlling said amount of the ingredient, said input signal corresponding to a desired number of measuring scoops.

11. The machine for preparing a hot beverage of claim 1, wherein the sensing system comprises a single sensor which determines a weight of the machine after each of an addition of water to the water tank and an addition of the ingredient to the brewing unit.

12. The machine for preparing a hot beverage of claim 1, wherein the electronic evaluation device comprises a microprocessor which compares values corresponding to the first and second electric signals with values stored in a table of values and determines an output value which is afterwards sent to the indicator instrument for display.

13. The machine for preparing a hot beverage of claim 1, wherein the indicator instrument comprises a display.

14. The machine for preparing a hot beverage of claim 1, wherein the indicator instrument includes a plurality of individual lamps.

15. The machine for preparing a hot beverage of claim 14, wherein each of the individual lamps is of a different color.

16. A machine for preparing a hot beverage, the machine comprising:

a water tank;

a brewing unit into which an ingredient can placed;

a heating unit for heating water from the water tank and supplying heated water to the brewing unit for extraction to produce hot beverage;

a sensing system for sensing both an amount of water to be supplied to the brewing unit and a desired a degree of strength input for the hot beverage to be produced, the sensing system sending a first electric signal corresponding to said amount of water and second electric signal corresponding to said desired degree of strength input;

an electronic evaluation device having an indicator instrument, the electronic evaluation device receiving said first and second electric signals and indicating a necessary amount of the ingredient on an indicator instrument.

17. The machine for preparing a hot beverage of claim 16, further comprising a data input device, wherein a data input representing an ideal degree of strength of the hot beverage for a user can be entered through the data input device and sent to the electronic evaluation device, and wherein a ratio of an amount of water to an amount of the ingredient may be calibrated in response to this data input and memorized in the electronic evaluation device.

18. The machine for preparing a hot beverage of claim 16, wherein the degree of strength is subdivided into at least three different grades, the the sensing system comprising an actuating device which can be operated by a user to input a desired degree of strength.

19. The machine for preparing a hot beverage of claim 16, wherein the sensing system comprises an actuating device which can be operated by a user to enter an input signal for controlling said amount of water, said input signal corresponding to a desired number of cups of the hot beverage to be produced.

20. The machine for preparing a hot beverage of claim 16, wherein the sensing system comprises a weighing apparatus for sensing the amount of water.

21. The machine for preparing a hot beverage of claim 16, wherein the sensing system comprises a volume measuring station for sensing the amount of water.

22. The machine for preparing a hot beverage of claim 16, wherein the sensing system comprises a flow rate measuring device for sensing the amount of water.

23. The machine for preparing a hot beverage of claim 16 further comprising a pump for delivering water from the water tank to the brewing unit, the pump delivering a defined amount of water per time unit, wherein the sensing system comprises a time sensor for sensing an active time period of operation of the pump for sensing the amount of water.

24. The machine for preparing a hot beverage of claim 16, wherein the electronic evaluation device comprises a microprocessor which compares values corresponding to the first and second electric signals with values stored in a table of values and determines an output value which is afterwards sent to the indicator instrument for display.

25. A machine preparing hot beverages, the machine comprising:

a water tank;

a brewing unit into which an ingredient can be placed;

a heating unit for heating water from the water tank and supplying heated water to the brewing unit for extraction to produce a hot beverage;

a sensing system for sensing both an amount of the ingredient placed in the brewing unit and a desired degree of strength input for the hot beverage to be produced, the sensing system sending a first electric signal corresponding to said amount of the ingredient and a second electric signal corresponding to said desired degree of strength input;

an electronic evaluation device having an indicator instrument, the electronic evaluation device receiving said first and second electric signals and indicating a necessary amount of water for producing the hot beverage on the indicator instrument.

26. The machine for preparing a hot beverage of claim 25, wherein the sensing system comprises a weighing station for sensing the amount of the ingredient.

27. The machine for preparing a hot beverage of claim 25, further comprising a feeding device that delivers a defined amount of the ingredient per time unit, wherein the sensing system comprises a time sensor for sensing an active time period of the feeding device.

28. The machine for preparing a hot beverage of claim 25, wherein the sensing system comprises a volume measuring station for sensing the amount of the ingredient.

29. The machine for preparing a hot beverage of claim 25, wherein the sensing system comprises an actuating device which can be operated by a user to enter an input signal for controlling said amount of the ingredient, said input signal corresponding to a desired number of measuring scoops.

30. The machine for preparing a hot beverage of claim 25, further comprising a data input device, wherein a data input representing an ideal degree of strength of the hot beverage for a user can be entered through the data input device and sent to the electronic evaluation device, and wherein a ratio of an amount of water to an amount of the ingredient may be calibrated in response to the data input and memorized in the electronic evaluation device.

31. The machine for preparing a hot beverage of claim 25, wherein the degree of strength is subdivided into at least three different grades, the sensing system comprising an actuating device which can be operated by a user to input a desired degree of strength.

32. The machine for preparing a hot beverage of claim 25, wherein the electronic evaluation device comprises a microprocessor which compares values corresponding to the first and second electric signals with values stored in a table of values and determines an output value which is afterwards sent to indicator instrument for display.

* * * * *